UNITED STATES PATENT OFFICE.

EMIL REBER AND JOSEF SIEGWART, OF BASEL, SWITZERLAND, ASSIGNORS TO SOCIETY OF CHEMICAL INDUSTRY IN BASLE, OF BASEL, SWITZERLAND.

N-MONOARYLSULFO-MONOALKYLAMINO-OXYARYL COMPOUNDS ABLE TO BE TRANSFORMED INTO MONOALKYLAMINO-OXYARYL COMPOUNDS AND PROCESS OF MAKING SAME.

1,316,804. Specification of Letters Patent. Patented Sept. 23, 1919.

No Drawing. Application filed August 17, 1918. Serial No. 250,323.

*To all whom it may concern:*

Be it known that we, EMIL REBER and JOSEF SIEGWART, both citizens of the Swiss Republic, and residents of Basel, Switzerland, have invented new and useful N-monoarylsulfomonoalkylamino-oxyaryl compounds able to be transformed into monoalkylamino-oxyaryl compounds and process of making same, of which the following is a full, clear, and exact specification.

We have found that the esters of the N-mono-arylsulfoamino-oxyaryl compounds of the general formula

(wherein R stands for an aryl radical, as for instance phenyl or naphthyl, $R_1$ for an arylsulfo radical and $R_2$ for an acidyl radical, as for instance an arylsulfo radical) can be converted smoothly into new esters of the N-monoarylsulfomonoalkylamino-oxyaryl-compounds, by treating them with the usual alkylating agents, as for instance, dialkylsulfates, arylsulfoalkylesters, alkyl halids, preferably in presence of an alkali.

These new esters of the N-monoarylsulfomonoalkylamino-oxyaryl-compounds can be employed as parent materials for the manufacture of monoalkylamino-oxyaryl-compounds of the general formula

(wherein R stands for an aryl radical and $R_3$ for an alkyl radical, as for instance a methyl radical). For this purpose the said new esters are treated with saponifying agents.

The new esters of the N-monoarylsulfomonoalkylamino-oxyaryl-compounds are colorless substances insoluble in water, soluble in the organic solvents and crystallizing well therefrom and melting at determined temperatures.

The solubilities in organic solvents and the fusion points of several paratoluenosulfoesters of N-paratoluenosulfo-monoalkyl-para-amidophenols are indicated in the following tabular exhibit:

| Constitution. | Fusion point. | In benzene. | | Solubility in alcohol. | | In glacial acetic acid. | |
|---|---|---|---|---|---|---|---|
| | | Cold. | Hot. | Cold. | Hot. | Cold. | Hot. |
| Methylderivative | 162° C. | difficultly soluble. | easily soluble. | very difficultly soluble. | difficultly soluble. | somewhat difficultly soluble. | easily soluble. |
| Ethyl-derivative | 117° C. | somewhat easily soluble. | easily soluble. | difficultly soluble. | somewhat easily soluble. | somewhat easily soluble. | easily soluble. |
| Benzyl-derivative | 142° C. | difficultly soluble. | easily soluble. | very difficultly soluble. | difficultly soluble. | difficultly soluble. | easily soluble. |
| Allyl-derivative | 113° C. | difficultly soluble. | easily soluble. | difficultly soluble. | somewhat easily soluble. | somewhat difficultly soluble. | easily soluble. |

The process is illustrated by the following examples:

Example 1.

41.7 parts of raw N-toluenosulfo-para-aminophenoltoluenosulfoester of the formula

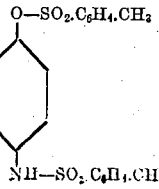

are dissolved at 60° C. in 120 parts of water and 16 parts of concentrated soda lye of 30 per cent. From the solution filtered the pure sodium salt of the N-toluenosulfo-para-amino-phenol-toluolsulfoester separates, on cooling, nearly quantitatively in form of lamellar white crystals.

When 22 parts of this sodium salt are heated in a closed vessel with 50 parts of methylalcohol and 2½ to 3 parts of methylchlorid, at 100 to 120° C. for several hours, the N-toluenosulfomonomethyl-para-aminophenoltoluenosulfoester is obtained, which separates nearly quantitatively in form of white small needles melting at 162° C.

The alkylation with other alkylating agents, as ethyl halid, allylbromid, ethylene bromid, benzylchlorid, etc., occurs in an analogous manner, in certain cases also in an open vessel provided with a reflux cooler, whereby other agents, as ethylalcohol, water, etc., may be employed as diluting agents or solvents.

The corresponding derivatives of ortho- or -metaaminophenol or of the aminonaphthols and their substitution products, which are substituted in the aminogroup by an arylsulforadical, in the hydroxylgroup by an acidyl radical, can also be alkylated easily.

The alkylation occurs also very smoothly when arylsulfoalkylesters or dimethylsulfate are employed as alkylating agents.

*Example 2.*

When 41.7 parts of N-toluenosulfo-para-aminophenoltoluenosulfoester are dissolved in the tenfold quantity of water and 15 parts of concentrated soda lye at 40 to 50° C. and 13 parts dimethylsulfate are added to the solution thus obtained, while stirring, the pure methylderivative separates after a short time quantitatively.

In an analogous manner the alkylation can be effected with arylsulfoalkylesters as for instance toluenosulfomethylester, etc. The transformation of the new-N-toluenosulfomonomethyl-para-aminophenoltoluenosulfoester into N-monomethyl-para-amidophenol is effected by acting on it with saponifying agents.

By an analogous reaction the corresponding esters of other alkylated aminophenols or aminonaphthols can be obtained.

What we claim is:

1. The herein described process for the manufacture of esters of N-monoarylsulfomonoalkylaminooxyaryl-compounds consisting in treating with alkylating agents the esters of N-monoarylsulfoamino-oxyaryl-compounds of the general formula

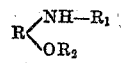

(wherein R stands for an aryl radical, $R_1$ for an arylsulforadical and $R_2$ for an acidyl radical).

2. The herein described process for the manufacture of N-toluenosulfomonomethyl-para-aminophenoltoluenosulfoester consisting in treating with a methylating agent the sodium salt of the N-toluenosulfo-para-aminophenoltoluenosulfoester.

3. As new products the herein described esters of N-monoarylsulfo-monoalkylamino-oxyaryl-compounds of the general formula

(wherein R stands for an aryl radical, $R_1$ for an arylsulfo radical and $R_2$ for an acidyl radical and $R_3$ for an alkyl radical) which constitute colorless substances of definite fusion points, insoluble in water, soluble in organic solvents and crystallizing well therefrom and able to be transformed by their saponification into monoalkylamino-oxyaryl-compounds.

4. As a new article of manufacture the herein described N - toluenosulfo - monomethyl-para-aminophenol-toluenosulfoester, constituting a colorless substance insoluble in water, difficultly soluble in cold benzene, easily soluble in hot benzene, difficultly soluble in alcohol, crystallizing in the form of small needles melting at 162° C. and able to be transformed by saponification into N-monomethyl-para-aminophenol.

In witness whereof we have hereunto signed our names this 26th day of July, 1918, in the presence of two subscribing witnesses.

EMIL REBER.
JOSEF SIEGWART.

Witnesses:
H. H. DICK,
ORMAND RITTER.